United States Patent
Genthikatti et al.

(10) Patent No.: US 9,187,055 B1
(45) Date of Patent: Nov. 17, 2015

(54) VEHICLE AIRBAG

(71) Applicant: TOYODA GOSEI CO., LTD., Kiyosu-shi, Aichi-ken (JP)

(72) Inventors: Vinay V. Genthikatti, Troy, MI (US); Linhuo Shi, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/557,502

(22) Filed: Dec. 2, 2014

(51) Int. Cl.
*B60R 21/233* (2006.01)
*B60R 21/2338* (2011.01)

(52) U.S. Cl.
CPC ........... *B60R 21/233* (2013.01); *B60R 21/2338* (2013.01); *B60R 2021/23316* (2013.01); *B60R 2021/23324* (2013.01); *B60R 2021/23382* (2013.01)

(58) Field of Classification Search
CPC .............. B60R 21/233; B60R 21/2338; B60R 2021/23324; B60R 2021/23316; B60R 2021/23382
See application file for complete search history.

(56) References Cited

U.S. PATENT DOCUMENTS

| | | | | |
|---|---|---|---|---|
| 5,358,273 | A * | 10/1994 | Onishi et al. | 280/743.1 |
| 6,254,121 | B1 * | 7/2001 | Fowler et al. | 280/729 |
| 7,198,290 | B2 * | 4/2007 | Yamada et al. | 280/731 |
| 7,584,988 | B2 * | 9/2009 | Okamoto et al. | 280/730.1 |
| 8,414,022 | B2 * | 4/2013 | Song et al. | 280/732 |
| 2006/0186656 | A1 * | 8/2006 | Kumagai | 280/743.2 |
| 2006/0279072 | A1 * | 12/2006 | Hanawa et al. | 280/729 |
| 2007/0267856 | A1 * | 11/2007 | Schedler | 280/743.2 |
| 2008/0048420 | A1 * | 2/2008 | Washino | 280/731 |
| 2015/0151707 | A1 * | 6/2015 | Chen et al. | 280/730.1 |

FOREIGN PATENT DOCUMENTS

JP      02-303951 A      12/1990

* cited by examiner

*Primary Examiner* — Drew Brown
(74) *Attorney, Agent, or Firm* — Posz Law Group, PLC (57) ABSTRACT

A vehicle airbag includes an airbag main body and an auxiliary airbag portion. A tether is located in the airbag main body. The rear end of the tether is connected to the boundary area between the airbag main body and the auxiliary airbag portion or to a part in the vicinity of the boundary area. The front end of the tether is connected either to a side wall portion closer to the auxiliary airbag portion or to the front wall portion of the airbag main body. The part of the front end of the tether that is connected to the front wall portion is farther from a side wall portion farther from the auxiliary airbag portion than the area in the front wall portion of the airbag main body onto which the part connected to the rear end of the tether is projected forward.

5 Claims, 7 Drawing Sheets

VEHICLE AIRBAG

BACKGROUND OF THE INVENTION

The present invention relates to a vehicle airbag that is inflated by inflation gas when an impact is applied to a vehicle such as an automobile, thereby protecting an occupant seated in a vehicle seat.

When an impact is applied to an automobile due to, for example, a frontal collision, the upper body of the occupant seated in the automobile seat acts to lean forward due to inertia. To deal with such a situation, an automobile airbag apparatus is effective that inflates an airbag in front of the occupant to protect the occupant from the impact.

Japanese Laid-Open Patent Publication No. 2-303951 discloses an automobile airbag used in such an automobile airbag apparatus. The airbag of the publication includes an airbag main body and auxiliary airbag portion. The airbag main body is a main part of the automobile airbag that is inflated in front of the occupant in response to an impact to the vehicle to restrict the forward leaning of the upper body of the occupant. The auxiliary airbag portion is inflated to project rearward from at least a part of the airbag main body, specifically, from a part that is close to a side wall portion with respect to the widthwise direction of an automobile seat, thereby restricting the sideways move of the occupant.

However, if the automobile receives a frontal and oblique impact, the automobile airbag of Japanese Laid-Open Patent Publication No. 2-303951 can cause the following problems.

That is, such an impact causes the upper body of the occupant to lean obliquely forward due to inertia. The airbag main body and the auxiliary airbag portion receive the load of the leaning occupant. However, in the above described automobile airbag, the part of the airbag main body and the auxiliary airbag portion that receives the load of the occupant cannot maintain the original shape, but may be deformed obliquely forward or sideways. Further, after contacting the automobile airbag, the head of the leaning occupant can rotate about the neck.

SUMMARY OF THE INVENTION

Accordingly, it is an objective of the present invention to provide a vehicle airbag that properly protect an occupant from a frontal and oblique impact applied to the vehicle.

To achieve the foregoing objective and in accordance with one aspect of the present invention, a vehicle airbag that includes an airbag main body and an auxiliary airbag portion is provided. The airbag main body has a front wall portion fixed to a vehicle and is inflated in front of an occupant seated in a seat of the vehicle by an inflation gas that is supplied in response to an impact applied to the vehicle. The airbag main body includes a front wall portion, a rear wall portion, and a pair of side wall portions that can be arranged in a widthwise direction of the vehicle seat. The side wall portions include a first side wall portion closer to the auxiliary airbag portion and a second side wall portion farther from the auxiliary airbag portion. The auxiliary airbag portion is inflated to project rearward from a part of the airbag main body that is close to at least one side wall portion with respect to a widthwise direction of the vehicle seat. A tether, which is caused to be in a taut state as the airbag main body is inflated, is located in the airbag main body. A rear end of the tether is connected to a boundary area between the airbag main body and the auxiliary airbag portion or to a part in the vicinity of the boundary area. A front end of the tether is connected either to the second side wall portion or to the front wall portion of the airbag main body. A part of the front end of the tether that is connected to the front wall portion is farther from the first side wall portion than an area in the front wall portion of the airbag main body onto which a part connected to the rear end of the tether is projected forward.

In accordance with the above described configuration, when a frontal and oblique impact is applied to the vehicle, the upper body of the occupant seated in the vehicle seat acts to lean obliquely forward due to inertia. In response to the impact, the airbag main body of the vehicle airbag is inflated in front of the occupant. The auxiliary airbag portion is inflated to project rearward from a part of the airbag main body that is in the vicinity of one of the side wall portions arranged in the widthwise direction of the vehicle seat. The inflated auxiliary airbag portion and airbag main body receive the load of the leaning occupant.

As the airbag main body and the auxiliary airbag portion are inflated, the tether is pulled. The rear end of the tether is connected to the boundary area between the airbag main body and the auxiliary airbag portion or to a part in the vicinity of the boundary area. The front end of the tether is connected either to the second side wall portion or to the front wall portion of the airbag main body. The part of the front end of the tether that is connected to the front wall portion is farther from the first side wall portion of the airbag main body than the area in the front wall portion of the airbag main body onto which the part connected to the rear end of the tether is projected forward. Thus, when pulled in the above described manner, the tether is under tension in a direction substantially perpendicular to the direction of the impact or in a direction close to the direction perpendicular to the direction of the impact. Therefore, in the boundary area between the airbag main body and the auxiliary airbag portion, the part connected to the rear end of the tether is restricted from being moved obliquely forward or sideways by the tensioned tether.

As a result, the airbag main body and the auxiliary airbag portion resist deformation obliquely forward or sideways when receiving the load of the occupant as described above. The airbag main body and the auxiliary airbag portion, which resist deformation, restrict rotation of the occupant's head about the neck when the occupant contacts the vehicle airbag.

DETAILED DESCRIPTION OF THE PREFERRED EMBODIMENTS

A vehicle airbag according to one embodiment will be described with reference to FIGS. 1 to 4. The vehicle airbag is used as an automobile airbag 20.

In the following, the direction in which an automobile advances forward will be referred to as the front, and the reverse direction will be referred to as the rear. The up-down direction refers to the up-down direction of the automobile, and the left and right direction refers to the automobile widthwise direction that matches with the left and right direction when the automobile is advancing forward.

Figure 1:
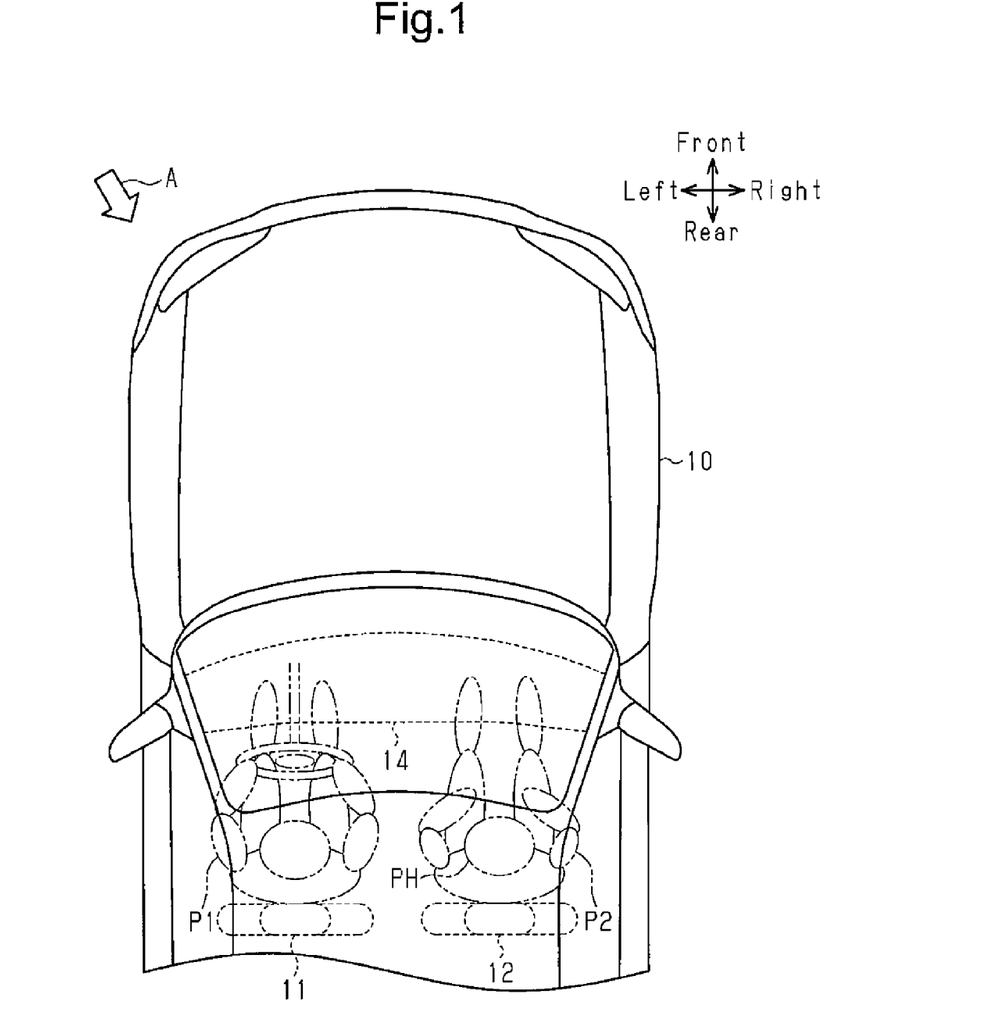
FIG. 1 is a partial plan view illustrating an automobile airbag, which is a vehicle airbag according to one embodiment.
Figure 2:
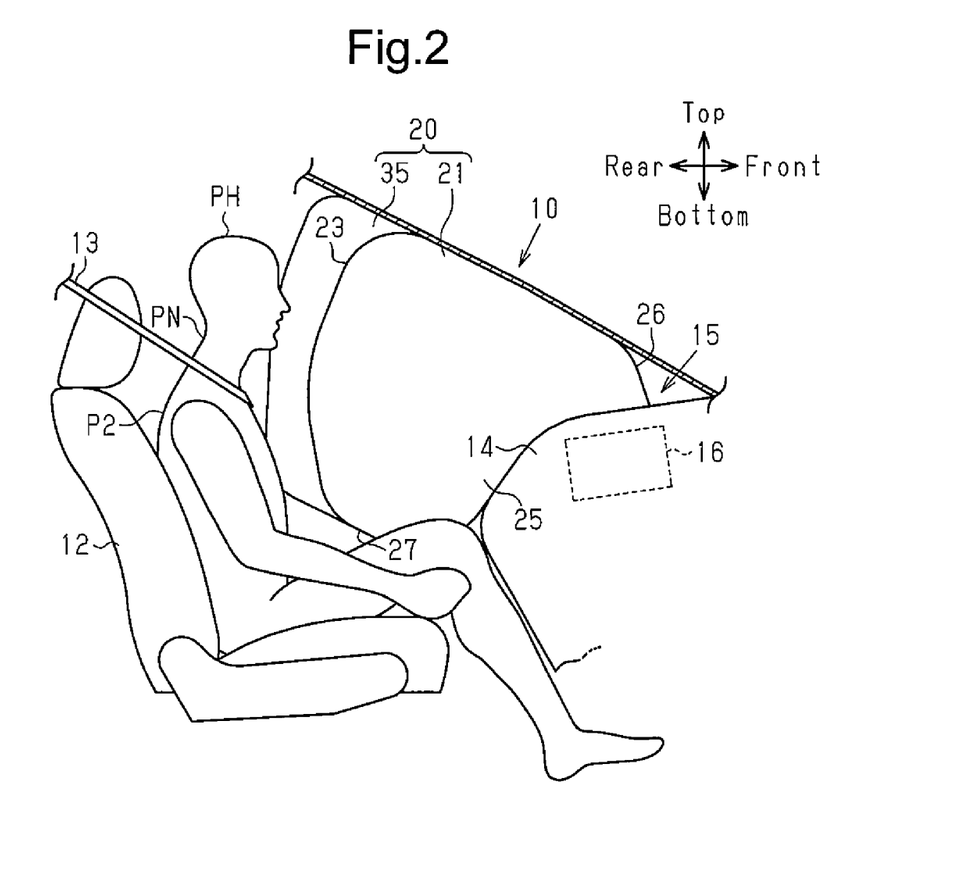
FIG. 2 is a partial cross-sectional side view illustrating a state in which the automobile airbag is deployed and inflated in front of the occupant seated in the front passenger seat in the embodiment of FIG. 1.

As shown in FIGS. 1 and 2, an automobile 10 includes automobile seats, or a driver's seat 11 and a front passenger seat 12, which are arranged along the width of the automobile 10. In the passenger compartment, a seat belt apparatus (not shown) for restraining an occupant P1 seated in the driver's seat 11 and another seat belt apparatus 13 for restraining an occupant P2 seated in the front passenger seat 12 are provided. The automobile 10 includes an instrument panel 14, which is located in front of the driver's seat 11 and the front passenger seat 12.

Figure 3:
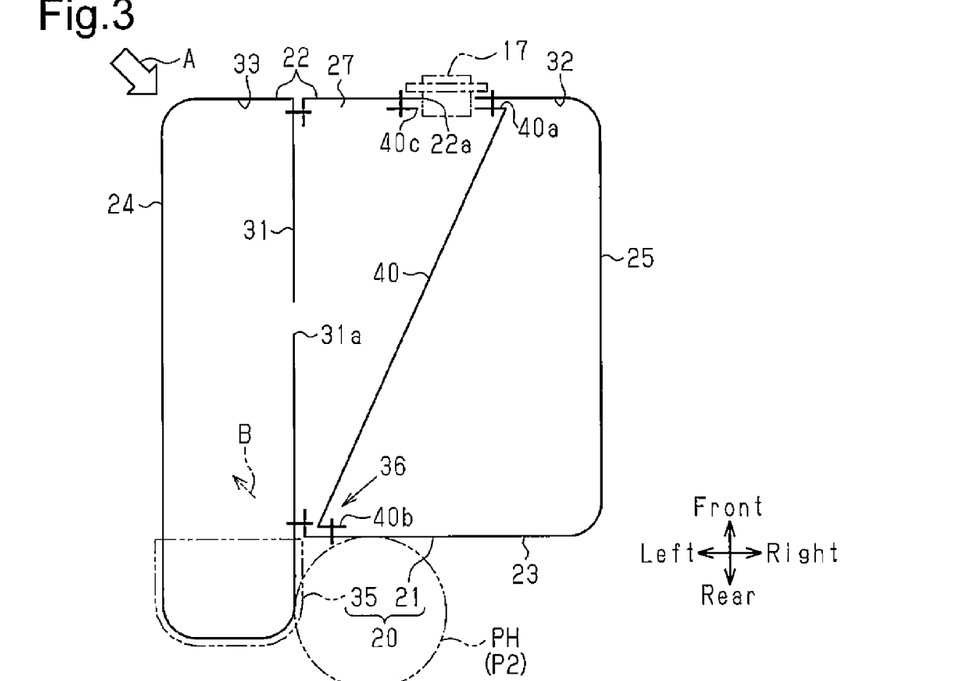
FIG. 3 is a cross-sectional view schematically showing a state in which the automobile airbag is deployed and inflated in the embodiment of FIG. 1, together with the head of the occupant in the front passenger seat and the inflator.

As shown in FIGS. 2 and 3, the automobile 10 has an airbag apparatus 15, which protects the occupant P2 in the front passenger seat 12 from a frontal and oblique impact applied to the automobile 10 due to, for example, a collision. The airbag apparatus 15 includes an airbag case 16, an inflator 17, and an automobile airbag 20. The airbag case 16 forms the outer shell of the airbag apparatus 15 and is formed by a high-strength material such as metal. The airbag case 16 is fixed to the body of the automobile 10 to be located in the instrument panel 14 and in front of the front passenger seat 12.

The inflator 17 is substantially disk-shaped and accommodates an igniter and a chemical agent. A connector is connected to the bottom of the inflator 17. In response to an electric signal via the connector, the igniter in the inflator 17 ignites the chemical agent to eject inflation gas. In place of the above described type, it is possible to use a type of inflator that ejects inflation gas by breaking, with a low explosive, a partition portion of a high-pressure gas cylinder filled with high-pressure gas.

The automobile airbag 20 has a size to be deployed and inflated between the instrument panel 14 and the occupant P2. The automobile airbag 20 is accommodated in the airbag case 16 in a folded state.

The main part of the automobile airbag 20 is formed by an airbag main body 21. The airbag main body 21 is formed of a material having high strength and flexibility to be easily folded. The material may be, for example, woven cloth formed of polyester threads or polyamide threads. The airbag main body 21 includes a front wall portion 22 and a rear wall portion 23, which are separated from each other in the front-rear direction, a pair of first and second side wall portions 24, 25, which sandwiches the front wall portion 22 and the rear wall portion 23 in the automobile widthwise direction, and an upper wall portion 26 and the lower wall portion 27, which sandwich the front wall portion 22 and the rear wall portion 23 from above and below. The front wall portion 22 has a hole 22a at a position closer to the second side wall portion 25 than to the first side wall portion 24. The hole 22a receives a part of the inflator 17. The airbag main body 21 is fixed to the airbag case 16 at the front wall portion 22 together with the inflator 17.

The airbag main body 21 has a partition portion 31 at a position that is closer to the driver's seat 11 than the center of the airbag main body 21 in the automobile widthwise direction (at a position close to the first side wall portion 24). The partition portion 31 divides the interior of the airbag main body 21 into a large-volume first inflation portion 32, which is farther from the driver's seat 11 and accommodates the inflator 17, and a second inflation portion 33, which is closer to the driver's seat 11. The second inflation portion 33 does not accommodate the inflator 17 and has a smaller volume than the first inflation portion 32. The first side wall portion 24 on the side of the airbag main body 21 that is closer to the driver's seat 11 forms the side wall portion of the second inflation portion 33. The partition portion 31 has a communication portion 31a for connecting the first inflation portion 32 and the second inflation portion 33, which are adjacent to each other with the partition portion 31 in between. In the present embodiment, holes formed in the partition portion 31 serve as the communication portion 31a.

Figure 4:
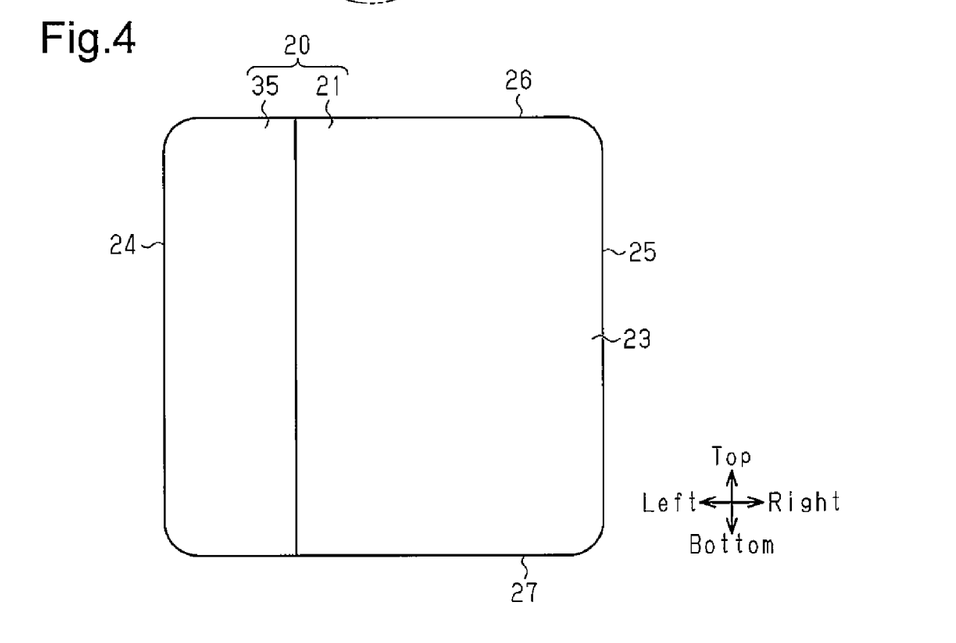
FIG. 4 is a rear view schematically showing of the deployed and inflated automobile airbag in the embodiment of FIG. 1.

As shown in FIGS. 2 to 4, the automobile airbag 20 has an auxiliary airbag portion 35 in addition to the airbag main body 21. The auxiliary airbag portion 35 is made of the same material as the airbag main body 21. The auxiliary airbag portion 35 projects further rearward than the rear wall portion 23 of the airbag main body 21 and communicates with the second inflation portion 33. The first side wall portions 24 is located closer to the auxiliary airbag portion 35 and the second side wall portion 25 is located farther from the auxiliary airbag portion 35.

With respect to the automobile widthwise direction, the auxiliary airbag portion 35 is continuous with the first side wall portion 24 on the side close to the driver's seat 11. With respect to the front-rear direction, the auxiliary airbag portion 35 is formed on the rear wall portion 23 of the airbag main body 21. With respect to the up-down direction, the auxiliary airbag portion 35 is provided over the entire length of the first side wall portion 24 from the upper wall portion 26 to the lower wall portion 27 of the airbag main body 21.

As shown in FIG. 3, a tether 40, which is made of a material similar to the airbag main body 21 and the auxiliary airbag portion 35, is arranged in the airbag main body 21. The tether 40 has a belt-like shape with a rear end 40b sewn to a boundary area 36 between the airbag main body 21 and the auxiliary airbag portion 35. The boundary area 36 is on the opposite side of the auxiliary airbag portion 35 from the first side wall portion 24.

A front end 40a of the tether 40 is connected to the front wall portion 22 of the airbag main body 21. The part of the front end 40a of the tether 40 that is connected to the front wall portion 22 is farther from the first side wall portion 24 than the area in the front wall portion 22 onto which the part connected to the rear end 40b of the tether 40 is projected forward. In the present embodiment, the front end 40a is sewn to a part of the front wall portion 22 that surrounds the hole 22a. Specifically, the front end 40a has a hole 40c for receiving the inflator 17, and the front end 40a is overlaid on the front wall portion 22 such that the hole 40c is aligned with the hole 22a. The front end 40a is then sewn to the front wall portion 22 along the holes 22a, 40c, so that the front end 40a is attached the front wall portion 22.

At least one of the rear end 40b and the front end 40a of the tether 40 may be connected by a means other than sewing, for example, by adhesive.

Operation of the above described present embodiment will now be described.

When a frontal and oblique impact is applied to the automobile 10 at the side at which the auxiliary airbag portion 35 is provided in the automobile widthwise direction, that is, when such an impact is applied to the side of the driver's seat 11 (the left side) as indicated by arrow A in FIGS. 1 and 3, the upper body of the occupant P2 seated in the front passenger seat 12 acts to lean obliquely forward due to inertia as indicated by arrow B in FIG. 3.

Meanwhile, in response to the impact, the inflator 17 supplies inflation gas to the first inflation portion 32 of the airbag main body 21. The inflation gas starts inflating the first inflation portion 32 while unfolding (deploying) the first inflation portion 32. At this time, the tether 40 is unlikely to hinder the deployment and inflation of the first inflation portion 32 since the tether 40 has a belt-like shape. From the middle of the deployment and inflation of the first inflation portion 32, the inflation gas in the first inflation portion 32 flows to the second inflation portion 33 via the communication portion 31a of the partition portion 31. Thus, the second inflation portion 33 starts being deployed and inflated slightly after the first inflation portion 32.

The upthrust generated by the inflation of the first inflation portion 32 and the second inflation portion 33 opens the airbag door (not shown) in the instrument panel 14 to form an opening (not shown) that allows the automobile airbag 20 to be deployed and inflated. Through the opening, the automobile airbag 20 is deployed and inflated between the instrument panel 14 and the upper body of the occupant P2, which is acting to lean forward.

Some of the inflation gas that has flowed into the second inflation portion 33 flows into the auxiliary airbag portion 35, which is connected to the second inflation portion 33. This portion of the inflation gas inflates the auxiliary airbag portion 35 so that the auxiliary airbag portion 35 protrudes rearward from the first side wall portion 24, which faces the driver's seat 11 and has received the impact in the airbag main body 21. The auxiliary airbag portion 35 and the airbag main body 21, which have been inflated in the above described manner, receive the load of the occupant P2 via the head PH and the like.

In the automobile airbag 20, as the airbag main body 21 and the auxiliary airbag portion 35 are inflated, the tether 40 is pulled. The rear end 40b of the tether 40 is connected to the boundary area 36 between the airbag main body 21 and the auxiliary airbag portion 35. The front end 40a of the tether 40 is connected to a part of the front wall portion 22 of the airbag main body 21 that is farther from the first side wall portion 24, which faces the driver's seat 11, than the area in the front wall portion 22 onto which the part connected to the rear end 40b of the tether 40 is projected forward. Thus, when pulled in the above described manner, the tether 40 is under tension in a direction substantially perpendicular to the direction of the impact or in a direction close to the direction perpendicular to the direction of the impact.

The part connected to the front end 40a of the tether 40 is a part of the front wall portion 22 of the airbag main body 21, which is fixed to the main body of the automobile 10 via the airbag case 16, and is a part that resists deformation in the automobile airbag 20. Therefore, the position of the front end 40a of the tether 40 resists change. Therefore, in the boundary area 36 between the airbag main body 21 and the auxiliary airbag portion 35, the part connected to the rear end 40b of the tether 40 is restricted from being moved obliquely forward or sideways by the tether 40 in a taut state. As a result, the airbag main body 21 and the auxiliary airbag portion 35 resist deformation obliquely forward or sideways when receiving the load of the occupant P2 as described above.

Particularly, in the present embodiment, the airbag main body 21 and the auxiliary airbag portion 35 receive the load of the occupant P2 leaning obliquely forward at a part close to the part connected to the rear end 40b of the tether 40. In the boundary area 36 between the auxiliary airbag portion 35 and the airbag main body 21, the rear end 40b of the tether 40 is connected to a part on the opposite side of the auxiliary airbag portion 35 from the first side wall portion 24 of the airbag main body 21. Therefore, in the airbag main body 21 and the auxiliary airbag portion 35, the part connected to the rear end 40b of the tether 40 and the part to which the load of the occupant P2 is applied are close to each other, so that, between these two parts, there is little part that can be deformed. Thus, when receiving the load of the occupant P2, the airbag main body 21 and the auxiliary airbag portion 35 resist deformation.

The airbag main body 21 and the auxiliary airbag portion 35, which resist deformation, restrict rotation of the head PH of the occupant P2 about the neck PN when the occupant P2 contacts the automobile airbag 20.

When the automobile 10 receives an impact from front, the inflator 17 ejects inflation gas as in the above described case, so that the airbag main body 21 and the auxiliary airbag portion 35 are deployed and inflated. The airbag main body 21 restricts the upper body of the occupant P2 from leaning forward. Also, the auxiliary airbag portion 35 restricts the occupant P2 from moving sideways (toward the driver's seat 11).

The present embodiment as described above achieves the following advantages.

(1) The present embodiment is applied to the automobile airbag 20, which includes the airbag main body 21 and the auxiliary airbag portion 35. The auxiliary airbag portion 35 projects rearward from a part in the airbag main body 21 that is close to the first side wall portion 24, which is close to the driver's seat 11. The tether 40, which is caused to be in a taut state as the airbag main body 21 is inflated, is located in the airbag main body 21. The rear end 40b of the tether 40 is connected to the boundary area 36 between the airbag main body 21 and the auxiliary airbag portion 35. In the airbag main body 21, the part of the front wall portion 22 connected to the front end 40a of the tether 40 is farther from the first side wall portion 24, which faces the driver's seat 11, than the area in the front wall portion 22 onto which the part connected to the rear end 40b of the tether 40 is projected (FIG. 3).

Therefore, when a frontal and oblique impact is applied to the automobile 10 on the side of the driver's seat 11 and the upper body of the occupant P2 seated in the front passenger seat 12 leans obliquely forward due to inertia and applies load to the auxiliary airbag portion 35 and the airbag main body 21, the auxiliary airbag portion 35 and the airbag main body 21 are restricted from being deformed excessively. Also, rotation of the head PH of the occupant P2 about the neck PN when the occupant P2 contacts the automobile airbag 20 is reliably restricted by the auxiliary airbag portion 35 and the airbag main body 21, which are deformed by a limited extent as described above.

(2) In the boundary area 36 between the auxiliary airbag portion 35 and the airbag main body 21, the rear end 40b of the tether 40 is connected to a part on the opposite side of the auxiliary airbag portion 35 from the first side wall portion 24 of the airbag main body 21, which faces the driver's seat 11. See FIG. 3. That is, the rear end 40b is connected to a part of the boundary area 36 that is close to the part to which the load of the occupant P2 is applied.

Therefore, in the airbag main body 21 and the auxiliary airbag portion 35, the part that can be deformed is diminished between the part connected to the rear end 40b of the tether 40 and the part to which the load of the occupant P2 is applied. Accordingly, deformation of the airbag main body 21 and the auxiliary airbag portion 35 when receiving the load of the occupant P2 is effectively suppressed.

The above embodiment may be modified as follows.

<Regarding Inflator 17>

Unlike the above illustrated embodiment, the inflator 17 may be located in the second inflation portion 33. In this case, the inflation gas ejected by the inflator 17 is first supplied to the second inflation portion 33 and then supplied to the first inflation portion 32 with a slight delay.

Figure 7:
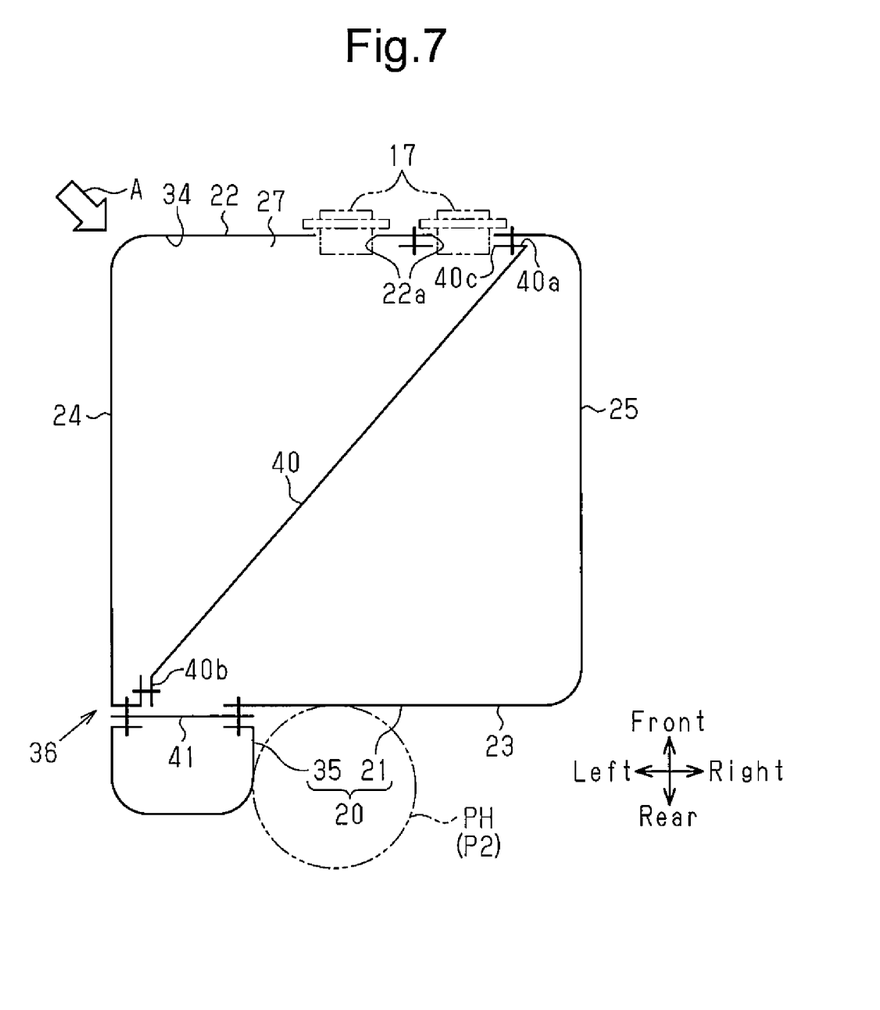
FIG. 7 is a cross-sectional view schematically showing an automobile airbag according to a modification, together with the head of the occupant in the front passenger seat and the inflator.

As indicated by the long dashed double-short dashed lines in FIG. 7, two or more inflators 17 may be provided in the front wall portion 22 of the airbag main body 21.

<Regarding Partition Portion 31>

Two or more partition portions 31 may be provided in the airbag main body 21 to divide the interior of the airbag main body 21 into three or more inflation portions.

Figure 5:
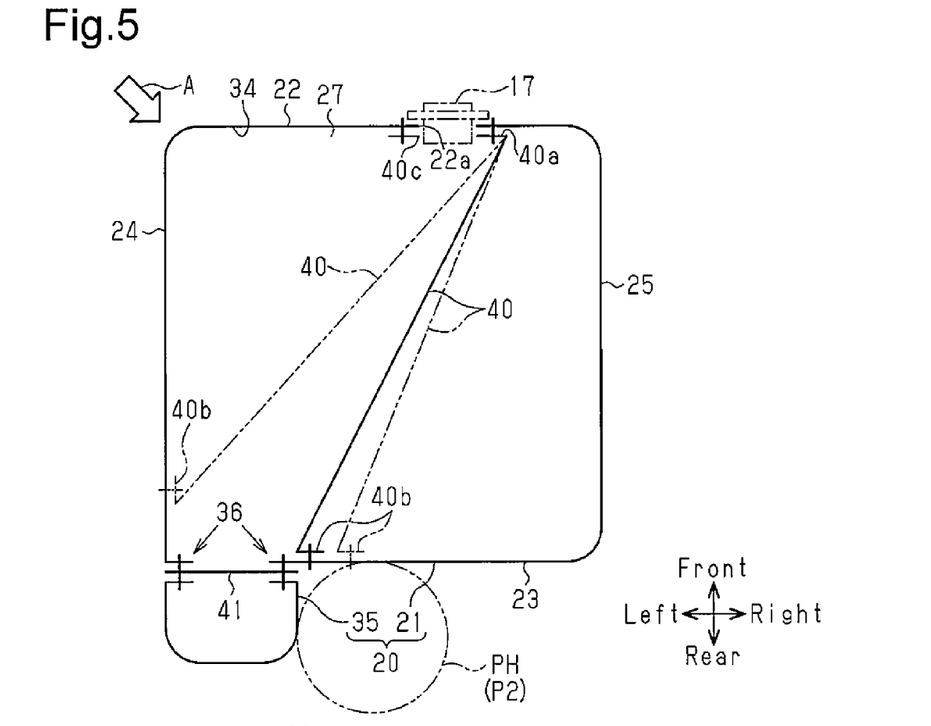
FIG. 5 is a cross-sectional view schematically showing an automobile airbag according to a modification, together with the head of the occupant in the front passenger seat and the inflator.

As shown in FIG. 5, the airbag main body 21 may be formed by a single inflation portion 34 without being divided by the partition portion 31. In this case, the auxiliary airbag portion 35 is connected to the inflation portion 34 at the rear end of the inflation portion 34, which has, as its side wall portion, the first side wall portion 24 on the side of the airbag main body 21 that corresponds to the driver's seat 11. In this case, a tether 41 for maintaining the inflated shape of the auxiliary airbag portion 35 is preferably provided at the part of the auxiliary airbag portion 35 that is attached to the airbag main body 21, while ensuring the communication between the auxiliary airbag portion 35 and the airbag main body 21.

Further, the tether 41 may be replaced by a partition portion (not shown) at the part of the auxiliary airbag portion 35 that is attached to the airbag main body 21. The inflated shape of the auxiliary airbag portion 35 can also be maintained in this case. The partition portion is required to have a communication portion such as hole for connecting the auxiliary airbag portion 35 and the bag main body 21 to each other.

<Regarding Auxiliary Airbag Portion 35>

Figure 6:
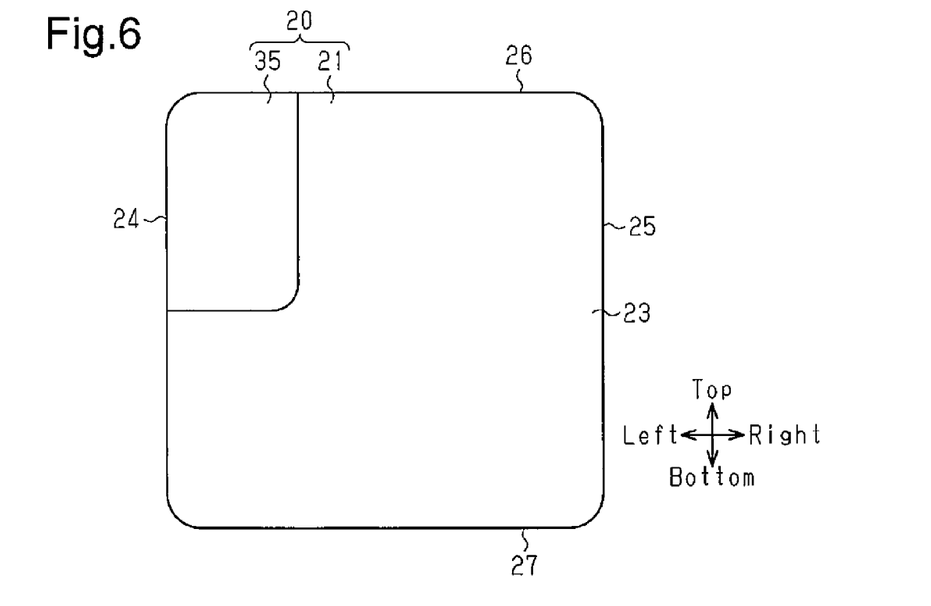
FIG. 6 is a rear view schematically showing an automobile airbag of a modification.

With respect to the up-down direction, the auxiliary airbag portion 35 may be provided only in a limited area between the upper wall portion 26 and the lower wall portion 27 of the airbag main body 21. FIG. 6 illustrates a case in which the auxiliary airbag portion 35 is provided in such a limited area.

The configuration of the auxiliary airbag portion 35 may be changed as long as it is inflated to protrude rearward from a part of the airbag main body 21 that is close to at least one of the first and second side wall portions 24, 25. Thus, the auxiliary airbag portion 35 may be provided at a part that is close to the second side wall portion 25, which is on the far side in relation to the driver's seat 11. Alternatively, an auxiliary airbag portion 35 may be provided at each of the parts of the airbag main body 21 that are close to the first and second side wall portions 24, 25.

Figure 8:
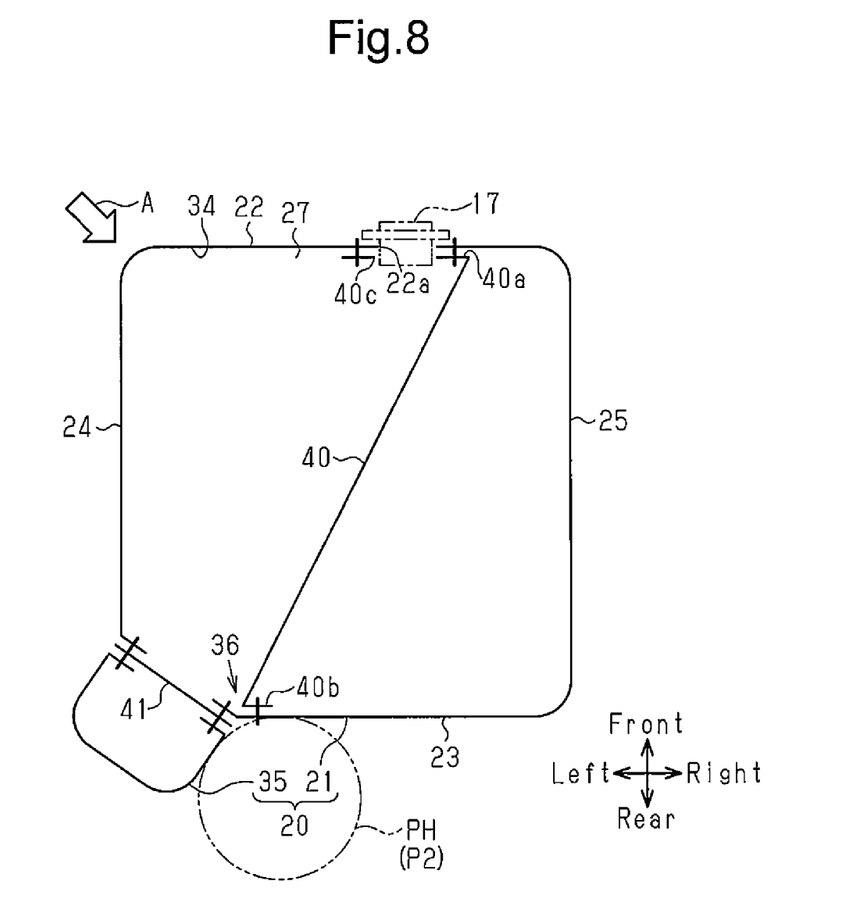
FIG. 8 is a cross-sectional view schematically showing an automobile airbag according to a modification, together with the head of the occupant in the front passenger seat and the inflator.

As shown in FIG. 8, the auxiliary airbag portion 35 may be provided at a corner of the airbag main body 21 between the first side wall portion 24 and the rear wall portion 23. In this case, the auxiliary airbag portion 35 may be inflated by the inflation gas to protrude rearward while being slightly inclined with respect to the front-rear direction.

In this case, a tether 41 similar to that shown in FIG. 5 may be attached to the part of the auxiliary airbag portion 35 that is attached to the airbag main body 21 to maintain the inflated shape of the auxiliary airbag portion 35. Alternatively, a partition portion (not shown) having a communication portion such as hole may be attached to the part of the auxiliary airbag portion 35 that is attached to the airbag main body 21.

<Regarding Tether 40>

FIG. 7 shows a case in which the airbag main body 21 is formed by a single inflation portion 34. In this case, in the boundary area 36 between the auxiliary airbag portion 35 and the airbag main body 21, the rear end 40b of the tether 40 may be connected to the same side as the first side wall portion 24 of the airbag main body 21 in the automobile widthwise direction.

FIG. 7 illustrates an example in which the auxiliary airbag portion 35 and the airbag main body 21 are formed separately from each other, and the rear end 40b of the tether 40 is connected to a corner between the first side wall portion 24 and the rear wall portion 23 in the airbag main body 21.

In this case, the airbag main body 21 and the auxiliary airbag portion 35 receive the load of the occupant P2 leaning obliquely forward at a part close to the part connected to the rear end 40b of the tether 40. In this case, between the part connected to the rear end 40b of the tether 40 and the part to which the load of the occupant P2 is applied, parts of the airbag main body 21 and the auxiliary airbag portion 35 that are subjected to deformation is larger than that in the above described embodiment. Even in this case, the tether 40 in a taut state restricts the part of the boundary area 36 connected to the rear end 40b of the tether 40 from moving obliquely forward or sideways (toward the driver's seat 11).

The rear end 40b of the tether 40 does not necessarily need to be connected to the boundary area 36 between the airbag main body 21 and the auxiliary airbag portion 35, but may be connected to a part in the vicinity of the boundary area 36. The two long dashed double-short dashed lines in FIG. 5 and the two long dashed double-short dashed line in FIG. 9 each show a tether 40 that has a rear end 40b connected to a part slightly spaced apart from the boundary area 36.

Figure 9:
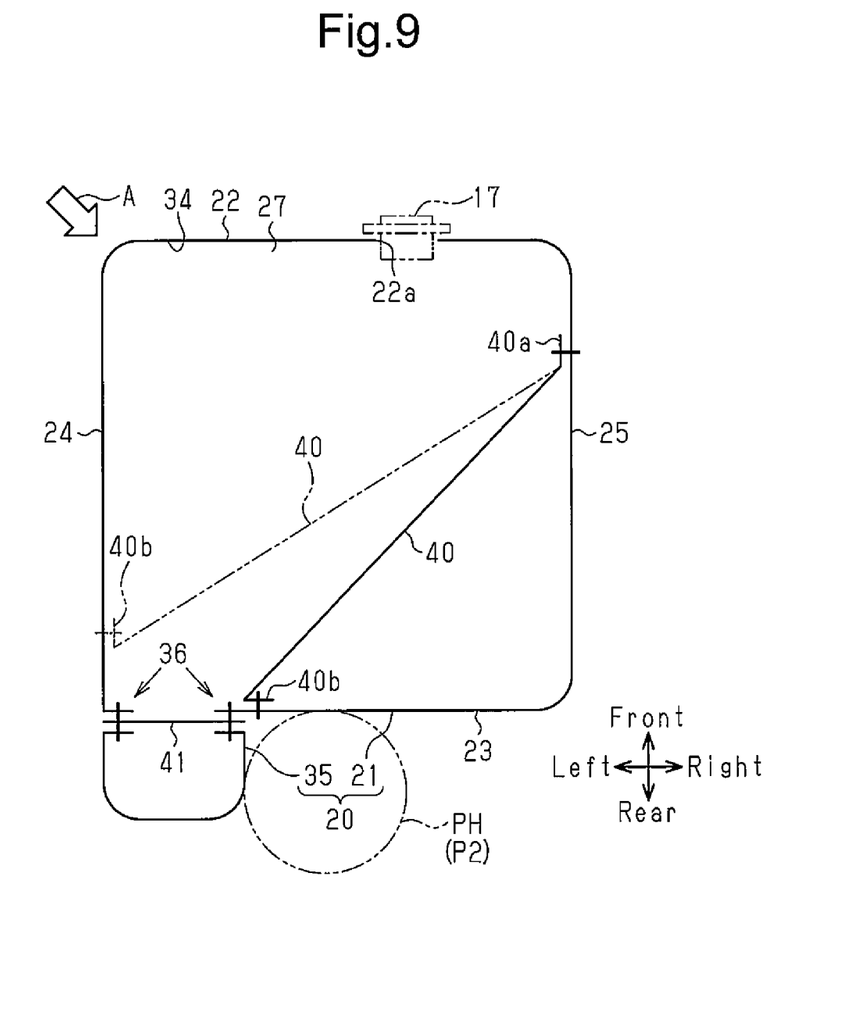
FIG. 9 is a cross-sectional view schematically showing an automobile airbag according to a modification, together with the head of the occupant in the front passenger seat and the inflator.

The rear end 40b of the left tether 40 in FIGS. 5 and 9 is connected to a part of the first side wall portion 24 that is slightly spaced forward from the boundary area 36. The rear end 40b of the right tether 40 in FIG. 5 is connected to a part of the rear wall portion 23 that is slightly spaced toward the second side wall portion 25 from the boundary area 36.

These modifications restrict the auxiliary airbag portion 35 and the airbag main body 21 from being excessively deformed and the auxiliary airbag portion 35 are suppressed by a greater extent, although by a lesser extent than in the case in which the rear end 40b is connected to the boundary area 36.

The front end 40a of the tether 40 may be connected to any part of the front wall portion 22 other than the connected part in the above described embodiment as long as the connected part is farther from the first side wall portion 24 than the area onto which the connected part of the rear end 40b of the tether 40 is projected forward. For example, the front end 40a may be attached to a part of the front wall portion 22 that is closer to the second side wall portion 25 than the hole 22a.

In this case, as the distance from the area onto which the rear end 40b is projected increases, the tether 40 in a taut state is inclined by a greater extent with respect to the front-rear direction, and deformation of the airbag main body 21 and the auxiliary airbag portion 35 are suppressed by a greater extent.

As shown in FIG. 9, the front end 40a of the tether 40 may be attached to the second side wall portion 25 of the airbag main body 21. This modification has the same advantages as the above illustrated embodiment.

The front end 40a and the rear end 40b of the tether 40 may be connected to parts at different heights. In this case, the tether 40 is inclined with respect to the horizontal direction as well as the front-rear direction when in a taut state.

Two or more tethers 40 may be used. This modification is effective for suppressing deformation of the auxiliary airbag portion 35 and the airbag main body 21 when the auxiliary airbag portion 35 is long in the up-down direction as shown in FIG. 4.

The tether 40 may have a constant or varying width in the front-rear direction. In the latter case, the tether 40 may have a width that gradually increases toward the rear end 40b.

The rear end 40b of the tether 40 may be connected to one or both of the airbag main body 21 and the auxiliary airbag portion 35 as long as the rear end 40b is connected to the boundary area 36 between the airbag main body 21 and the auxiliary airbag portion 35 or to a part in the vicinity of the boundary area 36.

The rear end 40b of the tether 40 may be connected to an upper portion or a lower portion of the auxiliary airbag portion 35 as long as the rear end 40b is connected to the boundary area 36 between the airbag main body 21 and the auxiliary airbag portion 35 or to a part in the vicinity of the boundary area 36.

OTHER MODIFICATIONS

The partition portion 31 of the above described embodiment may include a check valve that allows flow of inflation gas from the first inflation portion 32, which the inflator 17 is located, to the second inflation portion 33, in which the inflator 17 is not located, while prohibiting the flow in the reverse direction.

The automobile airbag 20 may be adapted to protect from an impact not only the occupant P2 seated in the front passenger seat 12, but also the passenger P1 seated in the driver's seat 11 or an occupant seated in the middle of a three-passenger seat.

Automobiles to which the above described vehicle airbag can be applied include various industrial vehicles in addition to private automobiles.

The above described vehicle airbag may also be installed in vehicles other than automobiles. For example, the vehicle airbag may be installed in vehicles such as aircrafts and ships to be inflated when a frontal and oblique impact is applied to the vehicle, thereby protecting an occupant seated in a vehicle seat.

The invention claimed is:

1. A vehicle airbag comprising:
an airbag main body that has a front wall portion fixed to a vehicle and is inflated in front of an occupant seated in a seat of the vehicle by an inflation gas that is supplied in response to an impact applied to the vehicle, wherein the airbag main body includes a front wall portion, a rear wall portion, and a pair of side wall portions that can be arranged in a widthwise direction of the vehicle seat; and
an auxiliary airbag portion that is inflated to project rearward from a part that is close to at least one of the side wall portions, wherein
the side wall portions include a first side wall portion closer to the auxiliary airbag portion and a second side wall portion farther from the auxiliary airbag portion
a tether, which is caused to be in a taut state as the airbag main body is inflated, is located in the airbag main body,
a rear end of the tether is connected to a boundary area between the airbag main body and the auxiliary airbag portion or to a part in the vicinity of the boundary area,
a front end of the tether is connected either to the second side wall portion or to the front wall portion of the airbag main body, and
a part of the front end of the tether that is connected to the front wall portion is farther from the first side wall portion than an area in the front wall portion of the airbag main body onto which a part connected to the rear end of the tether is projected forward.

2. The vehicle airbag according to claim 1, wherein, in the boundary area between the auxiliary airbag portion and the airbag main body, the rear end of the tether is connected to the opposite side of the auxiliary airbag portion from the first side wall portion of the airbag main body.

3. The vehicle airbag according to claim 1, wherein, in the boundary area between the auxiliary airbag portion and the airbag main body, the rear end of the tether is connected to the same side as the first side wall portion of the airbag main body with respect to the widthwise direction of the vehicle seat.

4. The vehicle airbag according to claim 3, wherein
the auxiliary airbag portion and the airbag main body are formed separately from each other, and
the rear end of the tether is connected to a corner between the first side wall portion and a rear wall portion of the airbag main body.

5. The vehicle airbag according to claim 1, wherein the tether has flexibility.

* * * * *